2,915,388
Patented Dec. 1, 1959

2,915,388

SEPARATION OF NICKEL AND COBALT

Alfred G. Lyle, Alhambra, Calif., Philip E. Brubaker, Arabi, La., and Arthur J. Beyer, Sierra Madre, Calif., assignors to American Cyanamid Company, New York, N.Y., a corporation of Maine No Drawing. Application November 19, 1957
Serial No. 697,329

5 Claims. (Cl. 75—108)

This invention relates to the hydrometallurgy of cobalt and nickel. More particularly it is concerned with the separation of these metals one from the other when both are contained in the same liquor.

Nickel and cobalt metals and their naturally-occurring minerals are very similar to one another in both physical and chemical properties. Moreover, both metals generally occur together in their natural deposits and cannot be separated by conventional ore dressing methods. For these reasons, both metals are generally present, in varying amounts, in all solutions that result from any type of leaching of either nickel or cobalt natural or intermediate products. Certain nickel-cobalt bearing ores, moreover, contain zinc in varying amounts. It is with the treatment of such nickel-cobalt-zinc-bearing ores and concentrates that the present invention is concerned.

One proposed procedure for treating such ores and concentrates comprises, in general, a series of steps involving (a) leaching to put the metal contents into solution; (b) separation of iron, aluminum, copper, lead and zinc to the extent possible by known procedures; (c) treatment of the nickel-cobalt liquor to recover a metallic nickel product; (d) further separation of nickel as a nickel-ammonium double salt; and, finally, (e) treatment of the residual cobalt solution to recover a metallic cobalt product.

This overall procedure has proved to be an excellent method for obtaining high purity elemental powdered nickel and cobalt products. Nevertheless, it suffers from several disadvantages. First, the precipitation of nickel from the nickel-cobalt liquor as nickel-ammonium double salt is not as complete as might be desired. Second, the precipitated nickel-ammonium double salt, which contains sufficient nickel to warrant treatment for the recovery thereof, also contains some zinc because of the difficulty of removing zinc to a preferred level in the zinc separation step. Accordingly, the precipitate cannot be recycled for recovery of nickel because of creating an undesirable buildup of zinc in the system.

Heretofore, the zinc-bearing nickel-ammonium double salt has been treated by putting it into acidulated solution and then precipitating zinc as zinc sulfide, which is then separated and disposed of as desired. The residual liquor containing nickel and some cobalt is made alkaline and further treated with hydrogen sulfide to precipitate nickel and cobalt as sulfides. This precipitate is recycled to the main treatment stream and put into solution as sulfates to be subsequently treated in the nickel and cobalt recovery steps. Similarly, the end liquor from the cobalt recovery containing low concentrations of nickel, cobalt and zinc may be added to the zinc sulfide precipitation step.

This method for treating the zinc-bearing double salt is not all that might be desired. First, it is not attractive because it constitutes a separated and independent operation from the overall flow scheme and necessarily involves additional equipment, manpower and supervisory requirements. Large amounts of hydrogen sulfide must be employed to precipitate the zinc, nickel and cobalt contents. In addition, the latter two must then be reconverted to sulfates when recycled in order to treat them in their respective recovery procedures.

It is, therefore, a primary object of the present invention to overcome the disadvantages of the above described procedure. It is a further object of this invention to eliminate the heretofore employed independent zinc separatory system. It is a still further object of this invention to recover nickel and cobalt with a considerably reduced consumption of hydrogen sulfide. It is an additional object of this invention to accomplish these various objects and at the same time obtain an improved nickel-ammonium double salt separation.

Surprisingly, these and other objects which will become apparent to those skilled in the art have been met in a simple yet unusually effective manner. In general, the process of this invention comprises first subjecting a feed liquor to a zinc control step to maintain therein a predetermined zinc content. This predetermined zinc content is such as to provide in solution an amount of zinc which will give an optimum separation of nickel from cobalt in the nickel-ammonium salt precipitation step. After taking a first nickel product, a nickel-ammonium salt containing zinc is precipitated and is recycled without separation of the zinc.

So far as the present process is concerned, the origin of the pregnant liquor to be treated is irrelevant. Leaching methods are known whereby the metal content of various nickel, cobalt and zinc-bearing materials such as ores, concentrates, plant by-products, and the like may be put into solution. Any of such methods may have been used to treat the source material resulting in the feed liquor being subjected to treatment according to the process of the present invention. Similarly, extraneous metal values such as iron, aluminum, chromium and the like may be separated by known methods, which form no part of this invention, for instance, as by precipitation as hydroxides and/or basic sulfates.

The feed liquor at this point contains in solution cobalt, nickel and zinc sulfates and may also contain small amounts of solubilized copper, lead and the like. This liquor is next subjected to a zinc control step which forms an important improvement of this invention. In this step, the soluble zinc content is adjusted to a predetermined level designed to produce optimum separation of nickel in the later practiced nickel ammonium double salt precipitation. This predetermined zinc content will be subsequently described in detail. If the feed liquor contains an amount of zinc greater than that required for optimum double salt separation, a controlled partial zinc sulfide precipitation is practiced using $H_2S$. On the other hand, it may be that the feed liquor has less than the required zinc content, in which case no precipitation of zinc sulfide is attempted but instead the zinc content is increased as by the addition of zinc sulfate. In either case, $H_2S$ is added to precipitate copper and lead and since zinc is the last of the three elements to precipitate, the copper and lead can be substantially removed prior to controlling the zinc content. The amount of $H_2S$ required to separate copper and lead as well as zinc, if necessary, will be dictated by the particular feed liquor being treated and can be readily determined by one skilled in the art.

The liquor from the zinc control step now contains cobalt, nickel and some zinc, the latter in a predetermined amount. This liquor in which the content of nickel and cobalt may vary considerably from a low to a high nickel to cobalt ratio is then treated to separate a nickel product. The particular manner in which this separation is conducted forms no part of this invention. A particularly effective method, however, involves a selective gaseous reduction to precipitate a metallic nickel product. Such a selective gaseous reduction is more fully described in U.S. Patents Nos. 2,694,005 and 2,694,006. In general, it comprises forming gas reducible ions of the nickel and cobalt contents and under appropriate conditions of solution composition, temperature and pressure as well as controlled hydrogen ion concentration, subjecting the solution to an overpressure of a reducing gas, preferably hydrogen. Metallic nickel powder, substantially free of cobalt, is thus precipitated and may be separated by known methods.

The optimum conditions for a separation as just described will leave some nickel in solution. This is separated, in accordance with this invention, by what is known in the art as a "pentammine" separation to leave substantially nickel-free cobalt solution.

In general, this "pentammine" separation comprises adjusting the dissolved ammonia content of the residual liquor so as to provide sufficient ammonia to form soluble cobalt and nickel "pentammine" complexes, if the cobalt and nickel are not already in this form. The sulfate ion concentration is also adjusted to provide at least sufficient sulfate ions to satisfy cobalt in its trivalent state and nickel in its bivalent state. The adjusted liquor is then subjected to oxidation at temperatures which may be as high as 100° C. but are preferably at about room temperature with a sulfur-free, oxygen-bearing oxidizing gas whereby a "cobaltic pentammine sulfate" is formed.

By cobaltic pentammine sulfate as used herein is meant a cobaltic ammine sulfate which is stable and soluble at a pH less than about 6. This is formed by providing in solution a mol ratio of ammonia to dissolved nickel plus cobalt of about 4:1–5:1. Higher ratios may also be employed provided they are not so high as to form the highly insoluble cobaltic hexammine sulfate. Ratios less than about 4:1 form ammines which are unstable and insoluble at the above descrbied acid conditions.

After oxidation, the hydrogen ion concentration is adjusted to not less than about pH 6 but not greater than that equivalent to about 2.0% aqueous sulfuric acid solution. Under these conditions, the cobaltic pentammine is stable and stays in solution but the nickel pentammine is unstable and precipitates as nickel ammonium sulfate. This pentammine separation procedure is more fully described in U.S. Patent No. 2,767,055.

It has been found, in accordance with this invention, that the described pentammine separation does not always reduce the nickel content of the cobalt liquor to the extent desired even when using excessive amounts of ammonium sulfate. The use of larger amounts of ammonium sulfate, moreover, may influence subsequent treatment procedures for recovering cobalt. In accordance with this invention, it has now been found that the presence of zinc in the solution during the pentammine separation influences precipitation of nickel so that a more optimum precipitation thereof is obtained. Why this phenomenon occurs would be mere conjecture and accordingly no explanation is given since there is no desire to so limit this invention. Whatever the theory of operation, however, it is an important feature of this invention that the zinc content be so controlled as to provide adequate zinc in solution during the pentammine separation.

How much zinc is required will depend on the particular liquor being treated. It can best be described with respect to the nickel content of the liquor. The zinc content, should be such as to provide a zinc:nickel mol ratio of from as low as 0.5–1 to as high as 5:1 and even higher. No sufficient added advantage appears to be gained, however, at ratios much higher than about 5:1 as to justify their use, while ratios less than 0.5:1 are usually inadequate to obtain the desired separation.

The precipitated nickel ammonium double salt containing zinc obtained in the pentammine separation step is separated and the residual cobaltic pentammine sulfate liquor, substantially free of nickel, treated in any way desired. One unusually successful method of treatment designed to recover a metallic cobalt product comprises a hydrogen reduction as more fully discussed in U.S. Patent Nos. 2,734,821, 2,767,081, 2,767,082 and 2,767,083. Whatever method, if any, is employed to treat the nickel-free cobalt liquor, it forms no part of this invention.

The zinc-bearing nickel-ammonium sulfate which contains a small amount of cobalt is not treated as previously to separately precipitate zinc, cobalt and nickel as sulfides. Instead, since a controlled amount of zinc must be maintained in the system for optimum operation of the pentammine separation, this salt is recycled. Accordingly, there is are substantial saving in $H_2S$ consumption which constitutes an additional important advantage of this invention. The precipitate may be recycled to various points in the system. Preferably it is recycled to the zinc control step. Alternatively, it may be introduced after the zinc control step but before the nickel recovery step since the amount of zinc in the precipitate will be less than the optimum due to loss in the residual cobalt liquor. In this case, a proper adjustment is made on the feed liquor alone to provide sufficient zinc when combined with that recycled.

The following example will further illustrate the invention.

Example 1

To a process liquor containing as sulfates 46.8 gr./l. nickel, 6.0 gr./l. cobalt, 1.05 gr./l. zinc. 0.36 gr./l. copper, 0.25 gr./l. iron, .015 gr./l. aluminum and 0.006 gr./l. lead is added recycled mixed salt crystals containing 8% Ni, 5% Zn and 3% Co to give a blended process liquor having Ni, Co and Zn contents of 47.6 gr./l., 6.18 gr./l. and 1.67 gr./l. respectively. This blended process liquor is then subjected to a controlled $H_2S$ treatment to obtain a total copper and lead precipitation and a predetermined partial zinc precipitation. The $H_2S$ treatment is conducted at 180° F. and at a pH of 2.5. Copper and lead are substantially completely precipitated prior to precipitation of zinc while nickel and cobalt pass through the treatment unprecipitated. The extent of zinc precipitation is controlled so as to retain in solution sufficient zinc to provide a Zn:Ni mol ratio of about 0.6:1.0 in the subsequent pentammine separation step. These results are obtained by feeding $H_2S$ gas at a rate of 4.9 lbs./1000 gallons of blended process liquor. The precipitate, containing about 42% of the dissolved zinc content, is separated and the liquor treated to remove the aluminum and iron contents to give a liquor containing 47.6 gr./l. Ni, 6.18 gr./l. Co and 0.614 gr./l. Zn. This liquor is treated to recover a powdered nickel powder by hydrogen reduction, which forms no part of this invention, as taught in U.S. Patents No. 2,694,005 and 2,694,006. The residual liquor containing 22 gr./l. Ni, 15 gr./ll. Zn and 70 gr./l. Co is subjected to a pentammine separation. After adjusting the $NH_3$ content to insure formation of pentammines of the Ni and Co contents, the adjusted solution is subjected to oxidation at 150° F. with 150 p.s.i.g. oxygen. The oxidized liquor is then acidified with $H_2SO_4$ and cooled with dilution water to precipitate a mixed sulfate containing 8% Ni, 5% Zn and 3% Co which is recycled to the process liquor. The product liquor from the pentammine separation contains 55 gr./l. Co, 0.055 gr./l. Ni and 1.16 gr./l. Zn, or a Co:Ni ratio of 1000:1, which is then treated for recovery of a metallic cobalt product.

What is claimed is:

1. In a process for the separate recovery of nickel and cobalt from a solution which contains dissolved salts of nickel, cobalt and zinc in which nickel is precipitated as product metal by reacting the solution at elevated temperature and pressure with a sulphur-free reducing gas and is separated from the solution and residual dissolved nickel values are precipitated from the solution to leave a substantially nickel-free solution which contains dissolved cobalt values, the improvement which comprises adjusting the zinc content of the nickel-cobalt-zinc containing solution to a mol ratio of zinc to nickel within the range of from about 0.5:1 to about 5:1 prior to the precipitation therefrom of dissolved nickel values as product nickel metal.

2. The process according to claim 1 in which the nickel-cobalt-zinc containing solution contains dissolved values of a metal selected from the group consisting of iron, aluminum and chromium, the zinc content of the solution is adjusted to a mol ratio of zinc to nickel within the range of from about 0.5:1 to about 5:1, values of metals selected from the group consisting of iron, aluminum and chromium are precipitated from the solution, and dissolved nickel values are thereafter precipitated and recovered from the solution as product nickel metal.

3. The process according to claim 1 in which the nickel-cobalt-zinc containing solution contains dissolved values of a metal selected from the group consisting of copper and lead, the solution is reacted with hydrogen sulphide to precipitate dissolved metal values of the group consisting of copper and lead as sulphides, and precipitated sulphides are separated from the solution prior to the zinc adjustment step.

4. The process according to claim 1 in which residual dissolved nickel values precipitated from the solution after the precipitation of product nickel metal are recycled to nickel-cobalt-zinc containing solution subjected to treatment in a succeeding operation of the process.

5. The process according to claim 1 in which the zinc content of the nickel-cobalt-zinc containing solution is adjusted to within the defined mol ratio of zinc to nickel by the addition thereto of zinc sulphate.

References Cited in the file of this patent

UNITED STATES PATENTS 2,722,480     Roy   ---------------- Nov. 1, 1955